United States Patent [19]

Fyfe

[11] Patent Number: 4,830,179
[45] Date of Patent: May 16, 1989

[54] IDLER ROLLERS FOR BELT CONVEYORS

[75] Inventor: Edward R. Fyfe, San Francisco, Calif.

[73] Assignee: Freeflow Industrial Ltd., Vancouver, Canada

[21] Appl. No.: 133,266

[22] Filed: Dec. 15, 1987

Related U.S. Application Data

[63] Continuation of Ser. No. 869,909, Jun. 3, 1986, abandoned.

[51] Int. Cl.$^4$ ............................................. B65G 39/12
[52] U.S. Cl. ................................... 198/825; 198/829; 198/843; 16/46; 16/98
[58] Field of Search ............... 198/825, 829, 842, 843; 193/37; 29/110, 129; 16/45, 46, 97, 98, 102

[56] References Cited

U.S. PATENT DOCUMENTS

| | | | |
|---|---|---|---|
| 666,164 | 1/1901 | Titus . | |
| 702,273 | 6/1902 | Acklin | 198/829 |
| 770,015 | 9/1904 | Merrill . | |
| 858,612 | 7/1907 | Mason . | |
| 1,156,386 | 10/1915 | Armstrong | 198/825 |
| 2,127,643 | 8/1938 | Glossmann | 198/825 |
| 2,895,594 | 7/1959 | Smith | 198/824 |
| 3,096,874 | 7/1963 | Wooldridge | 198/829 |
| 3,149,947 | 9/1964 | Haugen | 198/842 |
| 3,648,824 | 3/1972 | Speck | 198/192 |
| 4,029,200 | 6/1977 | Dillon | 193/37 |
| 4,241,826 | 12/1980 | Billington | 198/825 |
| 4,266,662 | 5/1981 | Reid | 198/829 |
| 4,377,883 | 3/1983 | Folson | 16/45 X |
| 4,463,840 | 8/1984 | Seynhaeve | 16/45 X |
| 4,606,659 | 8/1986 | Hogan | 193/37 X |
| 4,621,728 | 11/1986 | Kain | 193/843 |
| 4,664,243 | 5/1987 | Martin | 193/37 |

FOREIGN PATENT DOCUMENTS

| | | |
|---|---|---|
| 83306821 | 6/1984 | European Pat. Off. . |
| 150634 | 6/1969 | Netherlands . |
| 548981 | 2/1942 | United Kingdom . |
| 575526 | 2/1946 | United Kingdom . |
| 649687 | 1/1951 | United Kingdom . |
| 1123813 | 8/1968 | United Kingdom . |
| 2165621A | 4/1982 | United Kingdom . |

OTHER PUBLICATIONS

The Fyfe-Uhl Idler, Jan. 1985.
Technical Report Hercules 1900 Engineering Information, Jun. 1979.
2 Sheets of Conventional and Well-Known Bearings.

Primary Examiner—Randolph A. Reese
Assistant Examiner—Anthony Knight
Attorney, Agent, or Firm—Jack M. Wiseman

[57] ABSTRACT

A belt conveyor includes an assembly of conveyor idler rollers for supporting a conveyor belt advancing thereon. Each conveyor idler roller includes a cylindrical body that is freely rotatable about a shaft. A keeper seal prevents axial displacement of the cylindrical body along the shaft and inhibits foreign matter from penetrating into the central opening of the cylindrical body. The keeper seal comprises a radially projecting collar at the proximal end of the shaft which mates with a radially projecting groove formed in the cylindrical body to prevent axial displacement of the cylindrical body along the shaft and to inhibit foreign matter from penetrating the central opening of the cylindrical body.

27 Claims, 5 Drawing Sheets

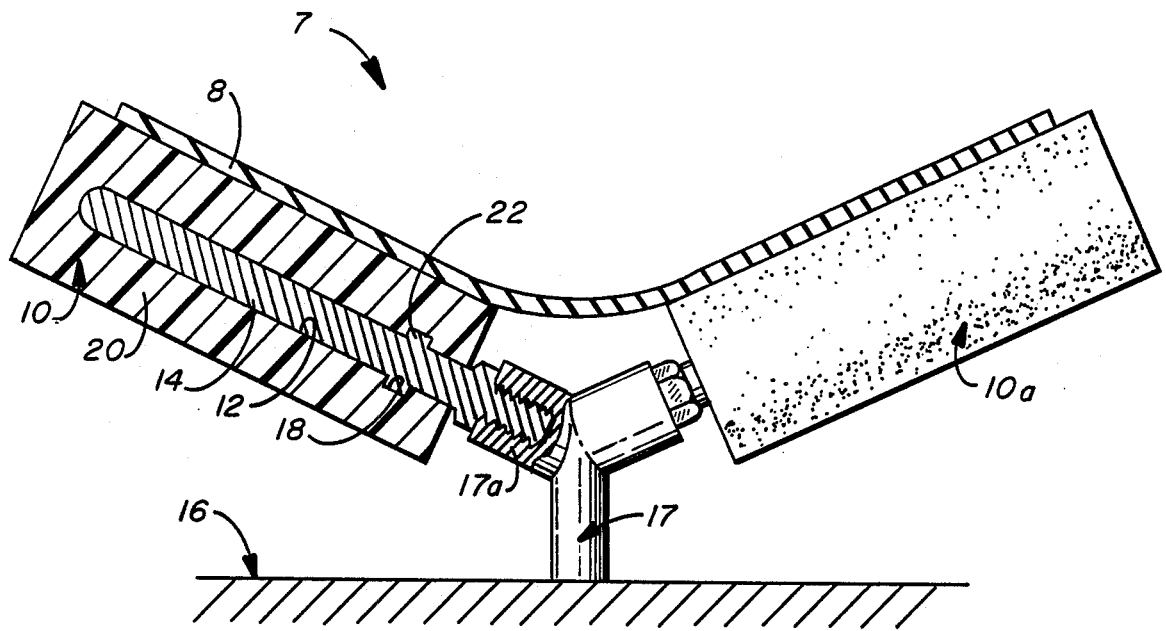
FIG._1.
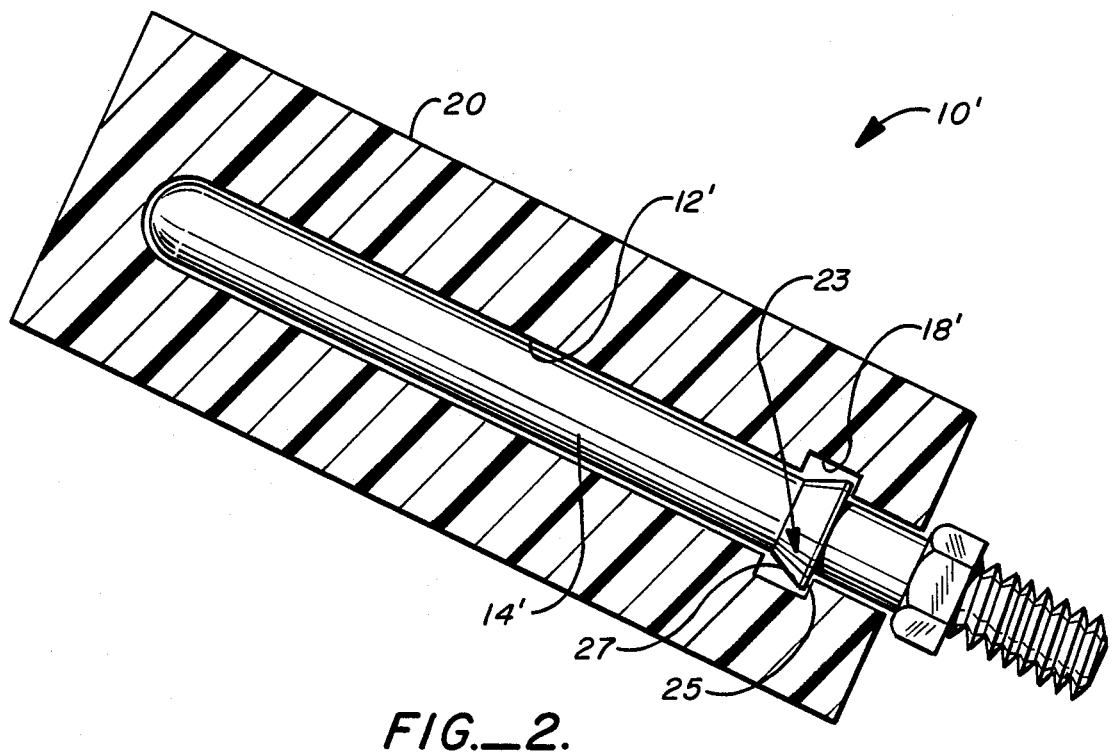
FIG._2.

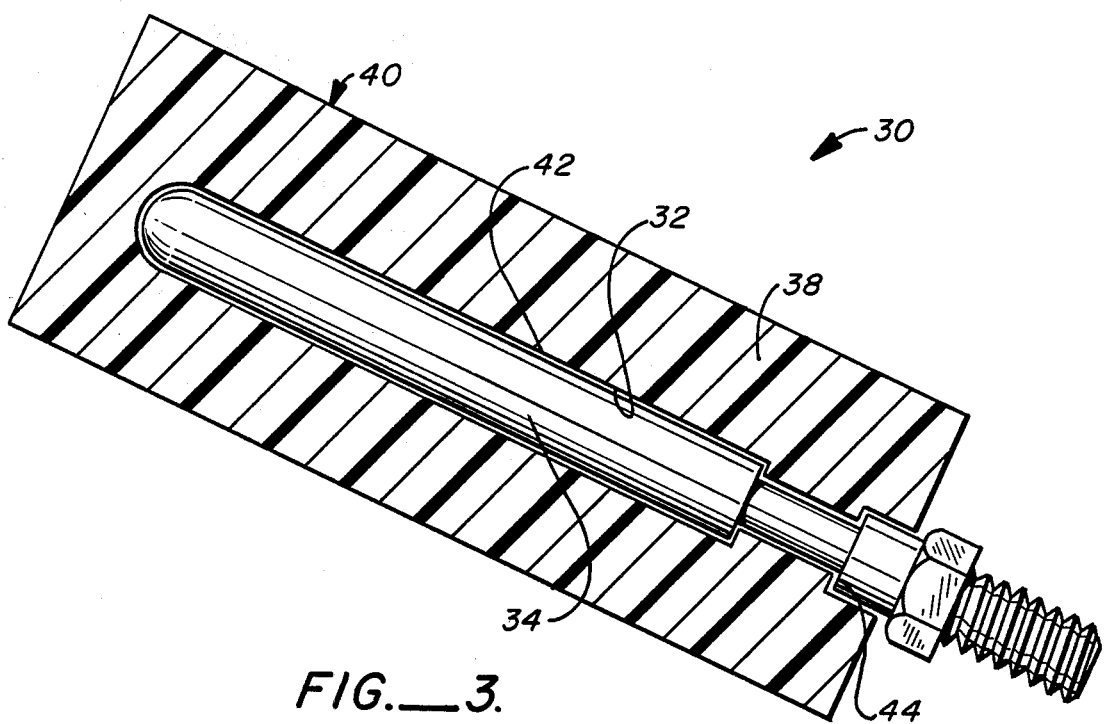
FIG._3.
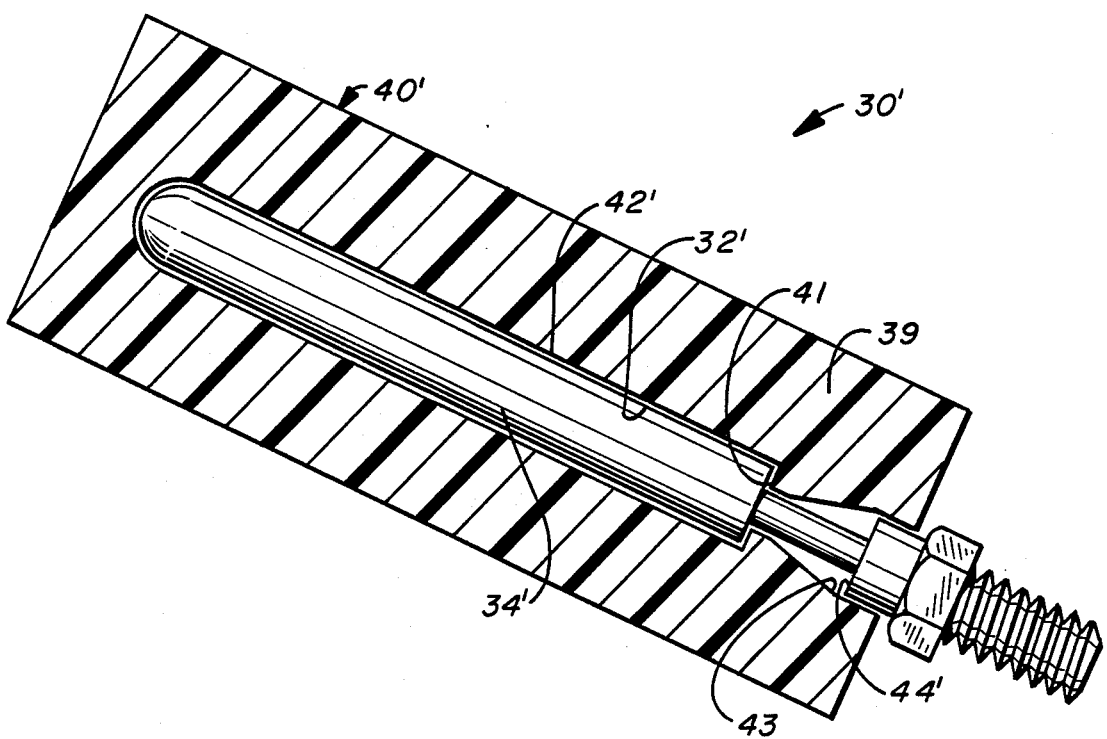
FIG._4.

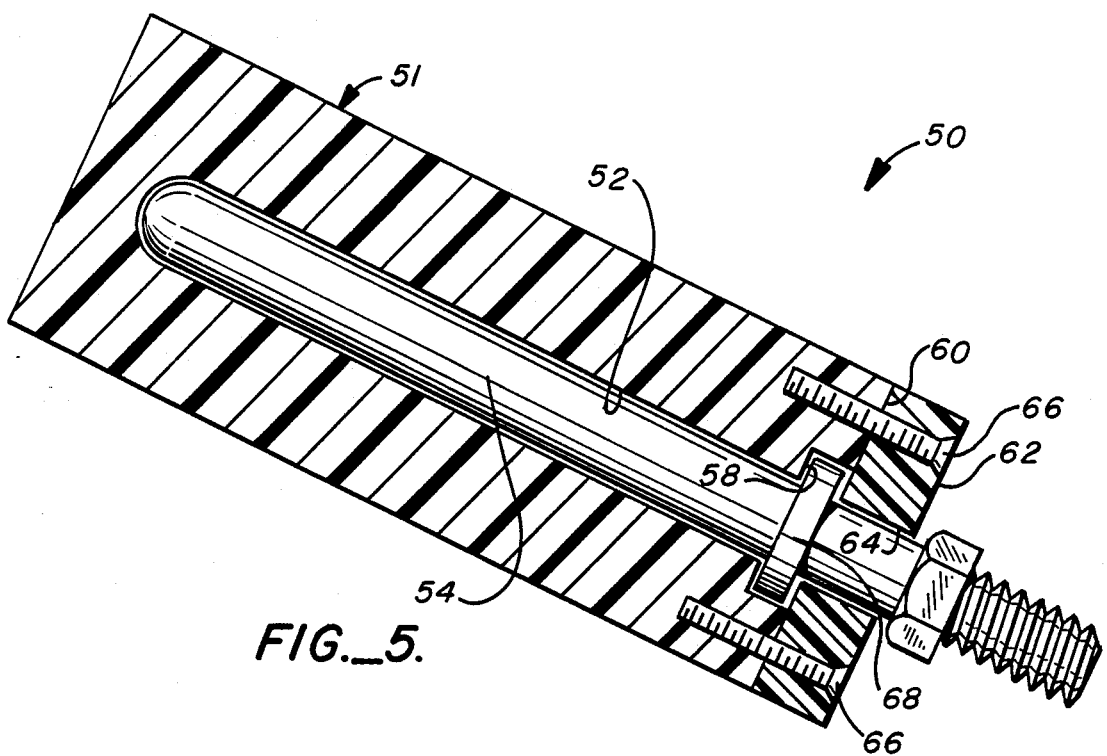
FIG._5.
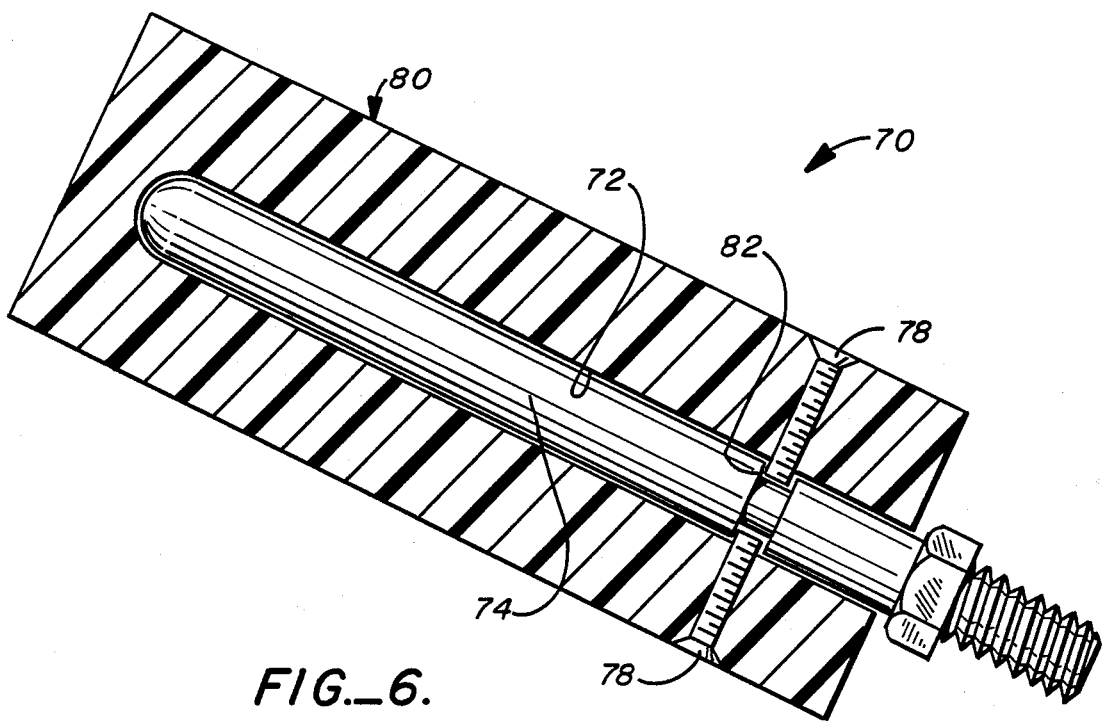
FIG._6.

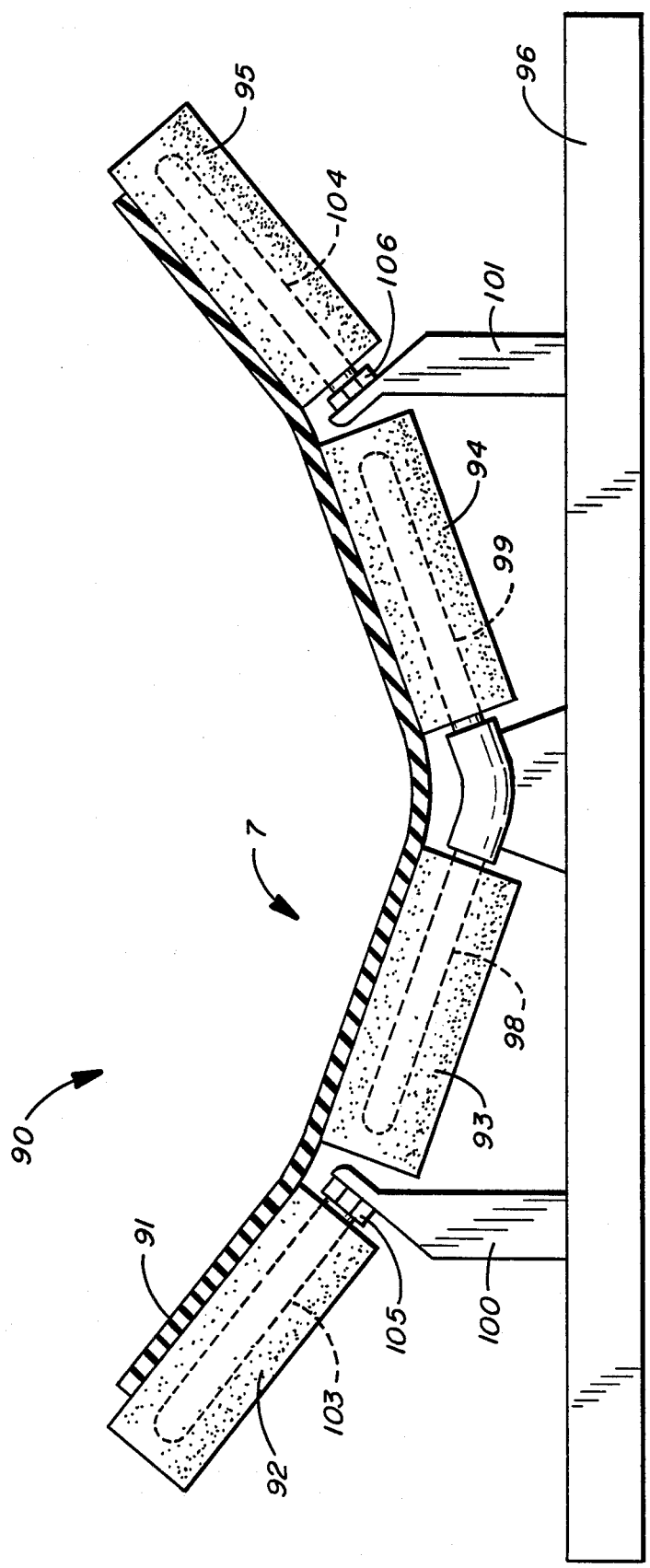
FIG._7.

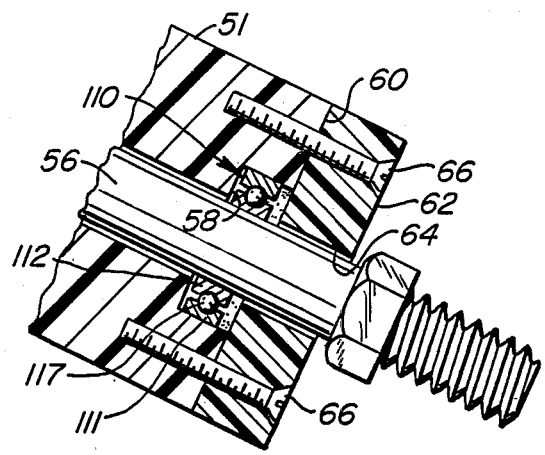
FIG._8.
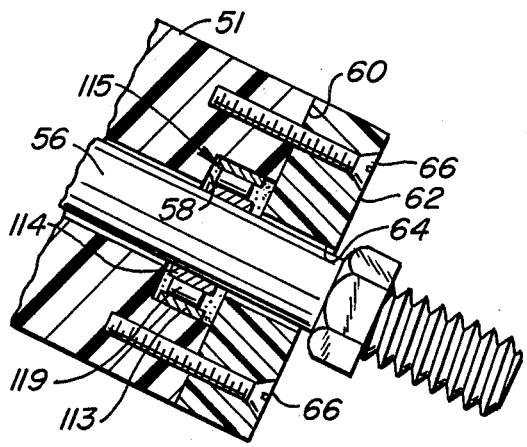
FIG._9.
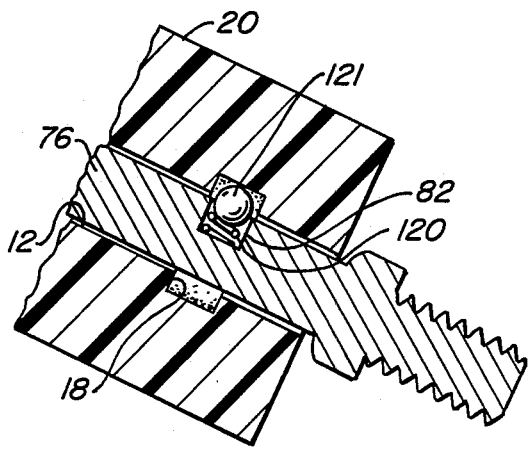
FIG._10.

IDLER ROLLERS FOR BELT CONVEYORS

This is a continuation of copending application Ser. No. 06/869,909 filed on June 3, 1986 now abandoned.

BACKGROUND OF THE INVENTION

The present invention relates in general to belt conveyors, and more particularly to idler rollers for conveyor belts.

Conveyor belts are widely used for transporting a variety of materials, e.g. sand, gravel, from one location to another. Such conveyor belts include not only flat bed conveyor belts, but also conveyor belts having a troughed configuration for improved retention of transported material. Conveyor belts typically run on a system of idler rollers with rotational power provided by a primer mover. Since the idler rollers associated with such conveyor belts experience considerable use, attention has been given to improving their reliability.

Idler rollers used with conveyor belts are typically exposed not only to continuous friction due to motion of the conveyor belt, but also to a wide variety of foreign matter. The foreign matter frequently presents serious wear problems to the moving surfaces associated with the idler rollers. Such foreign matter originates from a wide variety of sources and frequently originates from materials carried by the conveyor belt, e.g., sand, gravel, et cetera. Such materials have the potential of not only reducing the effect of lubricants employed to neutralize friction in idler roller assemblies, but also may cut and abrade associated bearing surfaces. As a result of such abrasive action, idler rollers are frequently replaced.

In addition to the foregoing, uneven distribution of load material on the conveyor belt may result in relative movement of an idler roller. Such relative movement not only acts to introduce additional wear on load bearing surfaces, but also causes axial displacement of the idler roller relative to the support shaft about which rotation occurs. This frequently not only disturbs the operation of the conveyor belt, but further impacts other related processes which rely on an uninterrupted operation of the conveyor belt.

The U.S. Pat. No. 666,164 to Titus, issued on Jan. 15, 1901, for Roller Mechanism For Conveyor Belts, discloses a pair of inclined laterally-extended tubular rollers, held in position at a lower end by a circumferential rib and an associated collar, and at an upper end by a shoulder and associated shoulder cap. Lubrication may be introduced into the assembly through an associated funnel arrangement.

The U.S. Pat. No. 858,612 to Mason, issued on July 2, 1907, for Rollers For Belt Conveyors, discloses the use of lateral-extended tubular rollers, inclined or projected in a direction transverse to the direction of travel of the conveyor belt to form a trough roller assembly.

The U.S. Pat. No. 3,648,824 to Speck, issued on Mar. 14, 1972, for Idler Roller Device For Troughed Conveyor Belts, discloses an arrangement for the reduction of friction through the use of a smooth bearing surface of a metal construction engaging a urethane surface. The patent to Speck further discloses an axial thrust bearing, e.g., a spherical ball bearing, disposed between an upper end of a roller and a support shaft. A pair of idler rollers are mounted on an upwardly and rearwardly inclined support shaft to exert a downward thrust to maintain the rollers on the support shaft.

The U.S. Pat. No. 4,266,662 to Reid, issued on May 12, 1981, for Trough Roller Assembly, discloses a radially projecting shoulder at the distal end of a support shaft, and an interfitting groove to prevent axial movement of the idler roller with respect to the support shaft.

Heretofore external keeper seals were employed in conjunction with idler rollers disposed for supporting conveyor belts having a troughed configuration. The purpose of the external keeper seals was to inhibit the penetration of moisture and dirt in the area between the shaft and the axial opening of the idler roller.

SUMMARY OF THE INVENTION

A trough-like conveyor belt advances over an assembly of cylindrical idler rollers. The axes of the transversely aligned idler rollers are angularly displaced relative to one another to conform to the trough-shape of the conveyor belt. Each idler roller comprises a cylindrical body rotatable about an axially disposed shaft. To prevent the cylindrical bodies from being axially displaced along the respective shafts, internal keeper seals are employed. Each internal keeper seal also inhibits the penetration of moisture and dirt between the internal bearing surface of a cylindrical body and the shaft about which it rotates.

A feature of the present invention is that the cylindrical body of an idler roller is not displaced axially relative to the shaft about which it rotates through a keeper seal. Additionally, the keeper seal inhibits the penetration of foreign matter between the wall of the axial opening of the cylindrical body and the shaft about which the cylindrical body rotates.

The cylindrical body of a conveyor idler roller is formed with an annular groove radially disposed about an idler opening thereof at the proximal end of the idler roller to receive a radially projecting collar formed on a shaft about which the cylindrical body rotates to prevent displacement of the cylindrical body in the axial direction along the shaft and to provide a seal to inhibit the penetration of foreign matter between the shaft and the cylindrical body.

In accordance with the present invention, the cylindrical body of a conveyor idler roller is formed with a radially disposed groove about its axial opening. The groove receives a radially disposed collar formed on a shaft disposed along the axis of the cylindrical body for preventing axial displacement of the cylindrical body along the shaft about which it rotates and to provide a seal between a bearing surface of the cylindrical body and the shaft about which the cylindrical body rotates.

More particularly, a cylindrical body of an idler roller with a radially disposed groove is rotatable about a shaft having a radially projecting collar. The groove of the cylindrical body receives the radially projecting collar of the shaft to prevent axial displacement of the cylindrical body along the shaft and to provide a seal for an internal bearing surface of the cylindrical body. In the preferred embodiment, the body is made of resilient material, such as polyurethane, rubber or elastomeric type material.

In another embodiment of the present invention, an idler roller comprises a cylindrical body having a radial projecting collar extending toward a shaft about which the cylindrical body rotates. The collar is received by a groove formed in the cylindrical wall of the shaft to limit axial displacement of the cylindrical body along the shaft and to provide a seal between the cylindrical body and the shaft.

DESCRIPTION OF THE DRAWINGS

FIG. 1 is a diagrammatic transverse cross-sectional view partially in elevation of a belt conveyor taken along the axes of a pair of transversely aligned idler conveyor rollers embodying the present invention.

FIG. 2 is an enlarged diagrammatic axial cross-sectional view partially in elevation of an idler conveyor roller which is a modification of an idler conveyor roller shown in FIG. 1.

FIG. 3 is a diagrammatic axial cross-sectional view partially in elevation of another embodiment of an idler conveyor roller incorporating the present invention.

FIG. 4 is a diagrammatic axial cross-sectional view partially in elevation of an idler conveyor roller which is a modification of the idler conveyor roller shown in FIG. 3.

FIG. 5 is a diagrammatic axial cross-sectional view partially in elevation of another idler conveyor roller incorporating the present invention.

FIG. 6 is a diagrammatic axial cross-sectional view partially in elevation of another idler conveyor roller incorporating the present invention.

FIG. 7 is a diagrammatic transverse cross-sectional view partially in elevation of a belt conveyor taken along the axes of a plurality of transversely aligned idler conveyor rollers embodying the present invention.

FIG. 8 is a fragmentary sectional view partially in elevation of an idler conveyor roller similar to the idler conveyor roller shown in FIG. 5 with a ball bearing being employed as a collar.

FIG. 9 is a fragmentary sectional view partially in elevation of an idler conveyor roller similar to the idler conveyor roller shown in FIG. 5 with a roller bearing being employed as a collar.

FIG. 10 is a fragmentary sectional view partially in section of an idler conveyor roller similar to the idler conveyor roller shown in FIG. 6.

DESCRIPTION OF THE PREFERRED EMBODIMENTS

Illustrated in FIG. 1 is a belt conveyor 7 comprising a conventional conveyor belt 8. In the exemplary embodiment, the conveyor belt 8 defines transversely thereof a trough-like configuration. The conveyor belt 8, in the exemplary embodiment, is supported by and travels over a plurality of pairs of idler conveyor rollers. Only idler conveyor rollers 10 and 10a are shown in FIG. 1. The conveyor 10 and 10a are similar in construction and operation. Hence, only the conveyor rollers 10 will be hereinafter described in detail.

The belt conveyor 7 is supported by a conventional and well-known frame 16 having generally Y-supports 17. The Y-supports 17 are formed with outwardly projecting arms having internally threaded walls surrounding respective bores thereof. The supports 17 may also be an M-shaped support plate and the frame 16 may be a steel angle plate with connection slots.

The cylindrical idler roller 10 comprises a cylindrical body 20. In the preferred embodiment, the cylindrical body 20 is made of suitable resilient material, such as polyurethane, rubber or elastomeric type of material. The cylindrical body 20 is formed with an inner axial opening 12 to receive a shaft 14 and is rotatable about the shaft 14. The shaft 14 is threadedly secured at one end thereof to the Y-support 17a of the frame 16. The end of the shaft 14 may be hemispherically shaped or convexly shaped and the confronting end of the axial opening 12 may be a conforming hemispherical shape or concavely shaped. Other suitable optimum bearing configurations may also be employed.

Formed in the cylindrical body 20 is an annular groove or recess 18 that projects radially outwardly from the central opening 12. The groove 18 is disposed intermediate the ends of the cylindrical body 20 adjacent the proximal end of the idler roller 10. Received by the central opening 12 is a shaft 14 about which the cylindrical body 20 rotates. The shaft 14 is formed with an outwardly radially projecting collar 22. In the exemplary embodiment, the collar 22 has an annular configuration. It may be integrally formed with the shaft 14 or it may be affixed to the shaft 14 by any suitable means, including welding or the use of set screws. The cylindrical body of the cylindrical idler roller 10 receives the shaft 14 with the radially projecting collar 22 being disposed within the radially projecting groove 18. The collar 22 and the groove 18 serve to prevent axial displacement of the cylindrical body 20 relative to the shaft 14 about which it rotates and to provide a seal to prevent foreign matter from penetrating the central opening 12.

The surfaces of the collar 22 and the bearing surfaces of the groove 18 may be coated with a well-known low friction lubricant to reduce wear and tear. Silicon or other suitable lubricants may be applied to the walls of the axial opening 12 of the idler roller 10 which contacts the shaft 14. The lubricant increases the allowable velocity of the roller 10 at the same bearing pressure. In this instance, the internal keeper seal of the present invention will also serve as a lubricant collector.

Since the cylindrical body 20 is made of resilient material, the cylindrical body 20 may be installed on the shaft 14 by temporarily spreading the shaft entrance wall of the central opening 12 and inserting the shaft 14 into the central opening 12 so that the collar 22 is inserted into the groove 18. Thereupon, the resilient action of the cylindrical body 20, upon release thereof, will be restored to its initial configuration. A suitable spreader tool, not shown, may be used for this purpose.

In FIG. 3 is illustrated a roller 10' which is a modification of the roller 10. Like parts in construction and operation between the roller 10 and the roller 10' have been indicated with the same reference number having a prime suffix. In FIG. 2, a radially disposed collar 23 is used in lieu of the radially disposed collar 22. The radially disposed collar 23 comprises a flat radial wall 25 which is generally perpendicular to the axis of the shaft 14, and an inclined frusto-conical wall 27 which is disposed at an acute angle relative to the axis of the shaft 14. The wall is inclined upwardly and outwardly as it progresses toward the proximal end of the idler roller 10'. The angular direction of the frusto-conical wall 27 is such as to facilitate the insertion of the radially projecting collar 23 into the groove 18'.

Illustrated in FIG. 3 is an idler roller 30 for supporting a conveyor belt travelling thereover, which is another embodiment of an idler roller incorporating the present invention. The idler roller 30 may be used in lieu of the idler rollers 10 and 10', respectively (FIG. 1). The idler roller 30 comprises a cylindrical body 40 made of resilient material, such as polyurethane, rubber or elastomeric type material. The cylindrical body 40 is formed with a cylindrical central opening 32 along the axis of the cylindrical body 40 which receives an axially disposed shaft 34. The shaft 34 is attached to the frame 16 through the Y-support 17 by threaded engagement therewith. The axis of the cylindrical central opening 32 is coextensive with the axis of cylindrical body 40. Formed in the cylindrical body 40 is an inwardly directed radially projecting collar 38, which extends inwardly toward the axis of the cylindrical body 40 form a inner wall 42 surrounding the central opening 32. The shaft 34 is formed with an annular recess or a groove 44 extending inwardly from the cylindrical wall of the shaft 34. The bearing surfaces of the radially projecting collar 38 and the walls defining the groove 44 may be coated with a well-known low friction lubricant to reduce wear and tear.

Since the cylindrical body 40 is constructed from resilient material, such as polyurethane, rubber or elastomer type material, the cylindrical body 40 may be installed on the shaft 34 by spreading the end of cylindrical body 40 through which the shaft 34 is inserted and inserting the shaft 34 into the central opening 32 with the radial collar 38 being disposed into the groove 44 of the shaft 34. After release of the spread end of the cylindrical body 40, the resilient action of the body 40 will return to its initial shape. A suitable spreader tool, not shown, may be used to spread the central opening 32 of the cylindrical body 40.

In FIG. 4 is illustrated a conveyor idler roller 30' which is a modification of the idler roller 30 (FIG. 3). Like parts in construction and operation between the idler conveyor roller 30 and the idler conveyor roller 30' are identified with the same reference number having a prime suffix. The cylindrical body 40' is formed with an inwardly directed, radially projecting collar 39 in lieu of the collar 38 (FIG. 3) of the body 40. Referring now to FIG. 4, the radial collar 39 is formed with a radially projecting wall 41 which is generally perpendicular to the axis of the cylindrical body 40', and a frusto-conical wall 43 which is disposed at an acute angle relative to the axis of the cylindrical body 40'. The frusto-conical wall 43 is inclined upwardly and rearwardly toward the proximal end of the idler conveyor roller 30'. The acute angle of the wall 43 facilitates the insertion of the collar into the groove 44'.

In FIG. 5 is illustrated a conveyor idler roller 50, which may be employed in lieu of the conveyor idler rollers 10 and 10' (FIG. 1). The conveyor idler roller 50 comprises a cylindrical body 51 made of a high density polyethylene or other non-elastomeric plastic materials. The cylindrical body 51 is formed with an axially disposed central opening 52 which receives a shaft 54. The shaft 54 is attached by threaded engagement to the arm of the Y-support 17 of the frame 16 (FIG. 1). Formed in the cylindrical body 51 is a radially extending annular groove 58. The annular groove 58 extends outwardly relative to the axis of the cylindrical body 51. The radially extending groove 58 is disposed adjacent to an end wall 60 of conveyor idler roller 50 and forms an open end therewith.

The conveyor idler roller 50 also includes an end cap 62 having a central opening 64 axially aligned with the central opening 52, which also receives the shaft 54. The end cap 62 is secured to the end wall 60 of the idler roller 50 by screws 66. Formed on the shaft 54 is a radially projecting collar 68. The radially projecting collar 68 may be integrally formed with the shaft 54 or may be affixed to the shaft 54 by suitable means, such as welding or set screws. The cylindrical central opening 52 of the cylindrical body 51 receives the shaft 54 with the radially projecting collar 68 disposed within the annular recess 58. The shaft 54 is inserted into the central opening 52 and the collar 68 is inserted into the groove 58 when the end cap 62 is removed from the cylindrical body 51. After the shaft 54 is inserted within the inner central opening 52 and the radially projecting collar 68 is disposed within the annular groove 58, the end cap 62 is secured to the end wall 60 of the cylindrical body 51. In this manner, the shaft 54 is disposed within the central opening 52 and the collar 68 is placed into the groove 58 with facility.

While the collar 68 is described as affixed to the shaft 54, the collar 68 may be in the form of a ball bearing 110 (FIG. 8) or a roller bearing 115 (FIG. 9) to provide bearing contact between the axially directed walls surrounding the groove 58 and the shaft 54. A suitable cage retains balls 117 in position and a suitable cage retains rollers 119 in position. Conventional races 111 and 112 are provided between which the balls 117 travel. Similarly, conventional races 113 and 114 are provided between which the rollers 119 travel.

The shaft 54 is secured by threaded engagement to the arm of the Y-support 17 of the frame 16. The cylindrical body 51 and the cap 62 secured thereto rotate freely about the shaft 54. The radially projecting collar 68 in conjunction with the annular groove 58 serve to prevent axial displacement of the cylindrical body 51 along the shaft 54 and to provide a seal to prevent foreign matter from penetrating the central opening 52. The walls of the radial collar 68 and the bearing surfaces of the walls defining the annular groove 58 may be coated with a well-known low friction lubricant to reduce wear and tear. The cap 66 of the conveyor idler roller 50 is disposed adjacent the end of the shaft 54 secured to the Y-support 17 of the frame 16 and, hence, at the proximal end of the cylindrical body 51.

In FIG. 6 is illustrated a conveyor idler roller 70, which may be used in lieu of the conveyor idler rollers 10 and 10', respectively. The conveyor idler roller 70 comprises a cylindrical body 80 made of a high density polyethylene or other non-elastomeric plastic materials. The cylindrical body 80 is formed with a cylindrical central opening 72 which serves to receive a shaft 74. The central opening 72 is disposed along the axis of the cylindrical body 80. The shaft 74 is secured by threaded engagement to the arm of the Y-support 17 of the frame 16. A plurality of set screws 78 is radially disposed within the cylindrical body 80 and are angularly spaced apart to form an annular array of set screws. The set screws 78, when fully positioned within cylindrical body 80, project radially inward into the central opening 72 toward the axis of cylindrical body 80.

The shaft 74 is formed with an annular groove 82 and is disposed in the central opening 72 of the cylindrical body 80 with the annular groove 82 receiving the distal ends of the set screws 78. The cylindrical body 80 is freely rotatable about the axis of the shaft 74. With the distal ends of the set screws 78 extending into the annular groove 82, the cylindrical body 80 is prevented from axial displacement along the shaft 74.

In lieu of the screws 78 (FIG. 6), a spring 120 (FIG. 10) under compression is disposed in the groove 82 and a ball 121 is spring urged into an annular groove 122 formed in the cylindrical body 80. The ball 121 projects within the annular groove 82 and the annular groove 122 under the urgency of the spring 120. This arrangement lends itself for easy installation and removal of the roller 80 from the shaft 74 when the roller is not operating as a conveyor element. Radial outward movement of the roller 80 enables the ball 121 to be removed from the grooves 82 and 122. When the ball 121 is so removed, the roller 80 can be removed from the shaft 74. Conversely, the replacement of the ball 121 within the grooves 82 and 122 enables the roller 80 to be restrained axially while permitting rotation about the axis of the shaft 74.

Illustrated in FIG. 7 is a belt conveyor 90 comprising a conventional conveyor belt 91. The conveyor belt 91 defines transversely thereof a trough-like configuration. The conveyor belt 91 is supported by and travels over a plurality of idler conveyor rollers 92-95. The idler conveyor rollers 92-95 are similar in construction and operation. In the exemplary embodiment, the idler conveyor rollers 92-95 are similar to the idler conveyor roller 10 heretofore described in detail. It is apparent that the idler conveyor rollers 92-95 could be similar to the idler conveyor rollers shown in FIGS. 2-6.

The belt conveyor is supported by a conventional and well-known frame 96. The proximal ends of the idler conveyor rollers 93 and 94 are supported by a Y-support or an M-shaped support plate 97 in a manner heretofore described in detail. The confronting ends of shafts 98 and 99 of the idler conveyor rollers 93 and 94, respectively, the threadedly secured to the outwardly projecting threaded arms of the Y-support 97 in a manner theretofore described in detail in connection with FIG. 1.

The outboard outwardly and upwardly inclined idler conveyor rollers 92 and 94 are supported at the lower ends thereof by angular shaped brackets 100 and 101, respectively. The brackets 100 and 101 are suitably secured to one end thereof to the frame 96 by welding. The other ends of the brackets 100 and 101 are respectively secured to shafts 103 and 104 of the idler conveyor rollers 92 and 94 by suitable lock nuts 105 and 106.

While the idler roller is described herein as a cylindrical body rotatable about a shaft, it is apparent that the cylindrical body may be a unitary structure or a plurality of contiguous cylindrical segments. Similarly, the shaft may be a stub shaft or a continuous shaft extending into a plurality of cylindrical bodies. It is within the contemplation of the prevent invention that the means for preventing axial displacement of the cylindrical body along the shaft and for inhibiting the penetration of foreign matter in the central opening of the cylindrical body in addition to being located at the proximal end of the idler roller may also be located at the free end of the idler roller. Although the preferred embodiment of the idler conveyor rollers have a trough-like configuration in the transverse direction, it is apparent that the axes of idler conveyor rollers in the transverse direction may be coextensive.

I claim:

1. A conveyor idler roller for a belt conveyor comprising:
   (a) a cylindrical body over which said belt conveyor advances formed with a central opening along the axis thereof, said central opening having an open end; and
   (b) a shaft insertable into said central opening through the open end thereof and disposed within said central opening with the axis thereof coextensive with the axis of said cylindrical body, said cylindrical body being freely rotatable about the axis of said shaft for the advancement of said belt conveyor thereover,
   (c) said cylindrical body and said shaft cooperating to form means therebetween disposed in the vicinity of the open end of said central opening for preventing axial displacement of said cylindrical body along said shaft while permitting said cylindrical body to rotate freely about the axis of said shaft and for inhibiting the penetration of foreign matter in said central opening of said cylindrical body.

2. A conveyor idler roller as claimed in claim 1 wherein said means comprises a radially extending groove formed in said cylindrical body and extending from said central opening, said means further comprises a radially projecting collar on said shaft extending from said shaft, said collar being disposed in said groove to prevent the axial displacement of said cylindrical body along said shaft while permitting said cylindrical body to rotate freely about the axis of said shaft and to inhibit the penetration of foreign matter in said central opening of said cylindrical body.

3. A conveyor idler roller as claimed in claim 2 wherein said cylindrical body is made of resilient material and said collar enters said groove while said resilient material is temporarily deformed, after said collar is inserted into said groove the resilient action of said cylindrical body restores said cylindrical body to its initial shape.

4. A conveyor idler roller as claimed in claim 3 wherein said collar is formed with a wall sloping upwardly and rearwardly toward the open end of said central opening to facilitate the insertion of said collar into said groove.

5. A conveyor idler roller as claimed in claim 3 and comprising a low friction lubricant disposed between said collar and a wall defining said groove and confronting said collar.

6. A conveyor idler roller according to claim 3 and comprising a lubricant disposed between said shaft and a wall surrounding said central opening, and wherein said collar and a wall defining said groove and confronting said collar collects lubricant from the space between said shaft and said wall surrounding said central opening.

7. A conveyor idler roller as claimed in claim 1 wherein said means comprises a radially extending groove formed in said shaft and extending inwardly from the cylindrical wall of said shaft, said means further comprises a radially projecting collar on said cylindrical body extending from said central opening, said collar being disposed in said groove to prevent the axial displacement of said cylindrical body along said shaft while permitting said cylindrical body to rotate freely about the axis of said shaft and to inhibit the penetration of foreign matter in said central opening of said cylindrical body.

8. A conveyor idler roller as claimed in claim 7 and comprising a low friction lubricant disposed between said collar and a wall defining said groove and confronting said collar.

9. A conveyor idler roller as claimed in claim 7 wherein said collar is made of resilient material and enters said groove while temporarily deformed, after said collar is inserted into said groove the resilient action of said collar restores said collar to its initial shape.

10. A conveyor idler roller as claimed in claim 9 wherein said collar is formed with a wall sloping upwardly and rearwardly toward the open end of said central opening to facilitate the insertion of said collar into said groove.

11. A conveyor idler roller according to claim 1 wherein the end of said shaft inserted into said central opening is disposed adjacent a closed end of said central opening, and wherein said end of said shaft inserted into said central opening and the closed end of said central opening have conforming hemispherical surfaces.

12. A conveyor roller as claimed in claim 1 wherein said means comprises a radially extending annular groove formed in said cylindrical body and extending from said central opening, a radially projecting annular groove formed in said shaft and extending inwardly from the cylindrical wall of said shaft, a spring disposed in said groove formed in said shaft, and a ball disposed in said groove formed in said shaft and said groove formed in said cylindrical body and retained in said grooves of said shaft and said cylindrical body under the urgency of said spring for preventing the axial displacement of said cylindrical body along said shaft while permitting said cylindrical body to rotate freely about the axis of said shaft and to inhibit the penetration of foreign matter in said central opening of said cylindrical body.

13. A conveyor idler roller for a belt conveyor comprising:
(a) a cylindrical body formed with a central opening, said central opening having an open end at one end of said cylindrical body;
(b) a shaft insertable into said central opening through the open end of said central opening at said one end of said cylindrical body and disposed within said central opening coaxially with the axis of said cylindrical body, said cylindrical body being rotatable freely about the axis of said shaft,
(c) said cylindrical body and said shaft cooperating to form means therebetween disposed adjacent said one end of said cylindrical body for preventing axial displacement of said cylindrical body along said shaft while permitting said cylindrical body to rotate freely about the axis of said shaft and for inhibiting the penetration of foreign matter in said central opening of said cylindrical body; and
(d) a cap secured to said one end of said cylindrical body for enclosing said collar and said groove, said cap having a central opening to receive the proximal end of said shaft.

14. A conveyor idler roller as claimed in claim 13 and comprising a low friction lubricant disposed between said collar and a wall defining said groove and confronting said collar.

15. A conveyor idler roller as claimed in claim 13 wherein said means comprises a radially extending groove formed in said cylindrical body and extending from said central opening, said means further comprises a radially projecting collar on said shaft extending from said shaft, said collar being disposed in said groove to prevent the axial displacement of said cylindrical body along said shaft while permitting said cylindrical body to rotate freely about the axis of said shaft and to inhibit the penetration of foreign matter in said central opening of said cylindrical body.

16. A conveyor roller as claimed in claim 15 wherein said collar is in the form of a ball bearing.

17. A conveyor roller as claimed in claim 15 wherein said collar is in the form of a roller bearing.

18. In a belt conveyor,
(A) a conveyor belt having a trough configuration; and
(B) idler rollers with adjacent confronting ends disposed below said conveyor belt for supporting said conveyor belt and with the axes thereof angularly displaced relative to one another to conform to the trough configuration of said conveyor belt, the axis of each of said idler rollers being disposed to extend outwardly and upwardly,
(C) each of said idler rollers comprising:
(a) a cylindrical body formed with a central opening along the axis thereof, the axis of said cylindrical body being coextensive with the axis of its associated idler roller, said central opening having an open end, and
(b) a shaft insertable into said central opening through the open end thereof and disposed within said central opening with the axis thereof coextensive with the axis of said cylindrical body, said cylindrical body being rotatable freely about the axis of said shaft,
(c) said cylindrical body and shaft cooperating to form means therebetween disposed in the vicinity of the open end of said central opening for preventing axial displacement of said cylindrical body along said shaft while permitting said cylindrical body to rotate freely about the axis of said shaft and for inhibiting the penetration of foreign matter in said central opening of said cylindrical body.

19. In a belt conveyor as claimed in claim 18 wherein said means comprises a radially extending groove formed in said cylindrical body and extending from said central opening, said means further comprises a radially projecting collar on said shaft extending from said shaft, said collar being disposed in said groove to prevent the axial displacement of said cylindrical body along said shaft while permitting said cylindrical body to rotate freely about the axis of said shaft and to inhibit the penetration of foreign matter in said central opening of said cylindrical body.

20. In a belt conveyor as claimed in claim 19 wherein said cylindrical body is made of resilient material and said collar enters said groove while said resilient material is temporarily deformed, after said collar is inserted into said groove the resilient action of said cylindrical body restores said cylindrical body to its initial shape.

21. In a belt conveyor as claimed in claim 20 wherein said collar is formed with a wall sloping upwardly and rearwardly toward the open end of said central opening to facilitate the insertion of said collar into said groove.

22. In a belt conveyor as claimed in claim 19 and comprising a low friction lubricant disposed between said collar and a wall defining said groove and confronting said collar.

23. In a belt conveyor as claimed in claim 18 wherein said means comprises a radially extending groove formed in said shaft and extending inwardly from the cylindrical wall of said shaft, said means further comprises a radially projecting collar on said cylindrical body extending from said central opening, said collar being disposed in said groove to prevent the axial displacement of said cylindrical body along said shaft while permitting said cylindrical body to rotate freely about the axis of said shaft and to inhibit the penetration of foreign matter in said central opening of said cylindrical body.

24. In a belt conveyor as claimed in claim 23 wherein said collar is made of resilient material and enters said groove while temporarily deformed, after said collar is inserted into said groove the resilient action of said collar restores said collar to its initial shape.

25. In a belt conveyor as claimed in claim 24 wherein said collar is formed with a wall sloping upwardly and rearwardly toward the open end of said central opening to facilitate the insertion of said collar into said groove.

26. In a belt conveyor as claimed in claim 23 and comprising a low friction lubricant disposed between said collar and a wall defining said groove and confronting said collar.

27. In a belt conveyor according to claim 18, an outboard idler roller disposed upwardly and outwardly adjacent each of said idler rollers at the upwardly and outwardly ends of said first mentioned idler rollers defining a configuration with said first mentioned idler rollers conforming to the trough configuration of said conveyor belt, each of said last mentioned rollers comprising:

(a) a cylindrical body formed with a central opening along the axis thereof, said central opening having an open end, and (b) a shaft insertable into said central opening through the open end thereof and disposed within said central opening with the axis thereof coextensive with the axis of said cylindrical body, said cylindrical body being rotatable freely about the axis of said shaft, (c) said cylindrical body and shaft cooperating to form means therebetween disposed in the vicinity of the open end of said central opening for preventing axial displacement of said cylindrical body along said shaft while permitting said cylindrical body to rotate freely about the axis of said shaft and for inhibiting the penetration of foreign matter in said central opening of said cylindrical body.

* * * * *